United States Patent
Schmid et al.

(10) Patent No.: US 10,011,356 B2
(45) Date of Patent: Jul. 3, 2018

(54) DEVICE, SYSTEM AND METHOD FOR ILLUMINATING A TARGET AREA

(71) Applicant: DIEHL AEROSPACE GMBH, Ueberlingen (DE)

(72) Inventors: Frank Schmid, Poppenricht (DE); Andreas Hammel, Wenzenbach (DE); Jan Guenther, Schwabach (DE); Marc Renz, Schwabach (DE); Dirk-Achim Schevardo, Roethenbach (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 55 days.

(21) Appl. No.: 15/153,974

(22) Filed: May 13, 2016

(65) Prior Publication Data

US 2016/0334631 A1  Nov. 17, 2016

(30) Foreign Application Priority Data

May 15, 2015  (DE) .................. 10 2015 006 194

(51) Int. Cl.
*B64D 11/00* (2006.01)
*G02B 27/09* (2006.01)
(Continued)

(52) U.S. Cl.
CPC ............... *B64D 11/00* (2013.01); *B60Q 3/43* (2017.02); *B60Q 3/74* (2017.02); *G02B 19/0014* (2013.01); *G02B 19/0028* (2013.01); *G02B 19/0061* (2013.01); *G02B 27/0916* (2013.01); *G02B 27/0983* (2013.01); *B64D 2011/0038* (2013.01)

(58) Field of Classification Search
CPC .. B60Q 3/43; B60Q 3/74; F21V 14/04; B64D 2011/0038
See application file for complete search history.

(56) References Cited

U.S. PATENT DOCUMENTS 4,142,227 A * 2/1979 Aikens ................. B60H 1/3442
                                                          362/364
4,933,822 A * 6/1990 NakaMats ............... F21S 6/003
                                                          362/282
(Continued)

FOREIGN PATENT DOCUMENTS

DE   19737653 A1   3/1999
DE   20102886 U1   8/2002
(Continued)

OTHER PUBLICATIONS

English Abstract of WO 2005/088353 A1, dated Sep. 22, 2005.

*Primary Examiner* — William N Harris
(74) *Attorney, Agent, or Firm* — Scully Scott Murphy and Presser

(57) ABSTRACT

An illumination device (6) comprising a light source (8) producing a first cone of light (10) and a deflection unit (12) for the beam-shaping conversion of the first cone of light (10) into a second cone of light (14a,b) and to emit the latter towards the target area (4a,b), the deflection unit (12) can be varied in order to vary the form (Fa,b) and/or the intensity distribution (Ia,b) in the second cone of light.
An illumination system (2) contains the illumination device (6) and the target area (4a,b).
The illumination device (6) or the illumination system (2) is used to illuminate a surface of an interior of a vehicle as target area (4a,b).

13 Claims, 3 Drawing Sheets

(51) Int. Cl.
    *G02B 19/00*     (2006.01)
    *B60Q 3/74*     (2017.01)
    *B60Q 3/43*     (2017.01)

(56) References Cited

U.S. PATENT DOCUMENTS

| | | | | |
|---|---|---|---|---|
| 5,219,445 | A * | 6/1993 | Bartenbach | F21V 7/0008 |
| | | | | 359/851 |
| 8,672,514 | B2 * | 3/2014 | Householder | F21V 7/0025 |
| | | | | 362/104 |
| 9,618,671 | B2 * | 4/2017 | Gaydoul | G02B 6/001 |
| 2008/0012728 | A1 * | 1/2008 | Heym | B64D 11/0015 |
| | | | | 340/945 |
| 2009/0010014 | A1 * | 1/2009 | Budinger | B64D 47/02 |
| | | | | 362/471 |
| 2012/0294021 | A1 * | 11/2012 | Hessling | B64D 47/04 |
| | | | | 362/470 |
| 2014/0307454 | A1 * | 10/2014 | Nisimura | B64D 11/00 |
| | | | | 362/471 |
| 2016/0091173 | A1 * | 3/2016 | Camp, III | B60Q 3/43 |
| | | | | 362/242 |

FOREIGN PATENT DOCUMENTS

| | | |
|---|---|---|
| DE | 10158395 A1 | 6/2003 |
| DE | 102004011660 A1 | 10/2005 |
| DE | 102008022795 A1 | 11/2009 |
| EP | 2529975 A2 | 12/2012 |

* cited by examiner

DEVICE, SYSTEM AND METHOD FOR ILLUMINATING A TARGET AREA

BACKGROUND OF THE INVENTION

The invention relates to the illumination of a target area.

DISCUSSION OF THE PRIOR ART

In practice there is often the task of illuminating a target area with the aid of a light source. Often, a predefinable, in particular homogenous, brightness distribution of the light on the target area is desired. The light sources used are often point-like light sources or point light sources, for example LEDs or an LED array. However, as a rule said light sources produce a non-homogenous brightness distribution on a specific target area.

From DE 101 58 395 A1 it is known to arrange an illumination optics unit between an LED semiconductor element and an area to be illuminated, in order to permit specific adjustment of the illumination of the area, irrespective of the form thereof.

SUMMARY OF THE INVENTION

The present invention is directed to an illumination device used to illuminate a target area. The illumination device contains a light source. The light source is designed to emit a first cone of light in operation. The illumination device additionally contains a deflection unit. At least part of the first cone of light reaches the deflection unit. The deflection unit is designed to convert the first beam from the cone of light into a second cone of light in a beam-shaping manner. The deflection unit is additionally designed to emit the second cone of light or at least part of the same towards the target area. The deflection unit is designed to be variable to the effect that the form of the second cone of light and the intensity distribution of the light in the second cone of light is variable. "Form" is to be understood to mean the spatial alignment or position and/or the form of the cone of light. Here, the intensity distribution relates to a cross section of the second cone of light, the cross section extends in particular transversely with respect to a central beam or an optical axis or main axis of the second cone of light. In particular, in a given cross section, the intensity distribution within the cross section can therefore be varied or chosen freely within the context of the given possibilities. The deflection unit therefore forms a beam-shaping element in the illumination device.

The present invention is based on the following findings: a light source, in particular a point light source, is generally not suitable to illuminate a specific or arbitrary target area homogenously. A homogenous brightness distribution means that the target area is illuminated homogenously, that is to say uniformly with the same brightness, or is perceived by an observer to be uniformly brightly illuminated. Influencing factors relating to achieving the homogeneity are the placing of the light source, permitted for a given installation situation, in relation to the target area and the, for example, lambertian or at least symmetrical light distribution of the light source, i.e. the intensity distribution in the cone of light emitted by the same. Therefore, a beam-shaping element in the form of the deflection unit is placed in front of the light source or between light source and target area, which ensures that the target area to be illuminated is illuminated with a desired brightness distribution.

The present invention is based on the thought that, using identical illumination devices, as a rule different target areas at a different distance are intended to be illuminated by the same illumination device, and that a specific brightness distribution is needed or desired on each of the target areas. For this purpose, an adaptation of the emission characteristics of the respective illumination device is necessary. In the case of the known illumination device, the beam-shaping element has to be re-created for each illumination device for this purpose, or a different beam-shaping element has to be used.

According to the present invention, all the illumination devices can be implemented constructionally identically. Only the deflection unit has to be varied or set or tracked appropriately in order to achieve the respectively required intensity distribution in a specific illumination device, in order to illuminate the corresponding target area as desired. In other words, the corresponding deflection units can be implemented structurally identically and merely have to be set—as a rule differently—for the respective application. According to the invention, the illumination conditions on the target area, i.e. the light pattern, can additionally be adapted dynamically by means of dynamically changing the deflection unit. The background here is that, for example in an aircraft cabin, attempts are made to floodlight extremely differently shaped surfaces (e.g. ceiling panels) with one and the same structurally identical light sources or luminaires as desired, in particular homogenously. For this purpose, adaptation of the emission characteristics is necessary. This adaptation could then be made by means of differently set deflection units, in particular reflectors.

The light source can also be designed, by means of changing the spectral composition of the light emitted over time, to display static or dynamic light scenarios on the target area or the illumination target.

The light source used can be, in particular, light sources for monochromatic, for example white, light or else full-colour light sources. The latter are defined by their respective colour gamut, for example in an RGB (red-green-blue) colour system.

The deflection unit, that is to say the beam-shaping element, can in particular be a transmission unit, i.e. formed transmissively, for example a lens or a filter element that is variable with respect to its deflection characteristics, through which the light to be deflected passes.

According to the invention, the deflection unit is designed to be variable in such a way that, for a given target area, it is possible to achieve at least one form according to which the target area can just be floodlit completely. Alternatively or additionally, it is possible to achieve an intensity distribution according to which the target area can be floodlit by the second cone of light with a homogenous brightness distribution. The brightness distribution here is homogenous either in one or in two dimensions, which means that the brightness at specific locations of the area is either the same along one or more (parallel) lines (one dimension) or over the area (two dimensions). Homogenous brightness distributions in one or two dimensions are often desired on areas in order to produce an overall uniform appearance, or one acting "in a calming manner" on an observer of the illuminated area. The illumination device is then particularly suitable for this purpose or it is ensured that, in the case of a given target area, a corresponding brightness distribution can also be achieved.

According to the invention, at least two different target areas are predefined. The deflection unit is then designed to be variable in such a way that, for each of the target areas, in each case at least one form can be achieved, according to which the respective target area can just be floodlit completely and/or it is possible to achieve at least one intensity distribution according to which the respective target area can be floodlit by the second cone of light with a homogenous brightness distribution in one or two dimensions. According to the invention, it is ensured that the illumination device is able to produce respective homogenous brightness distributions at least for two different target areas. Different target areas can differ, for example, in terms of their form or else in terms of their different distance or their different relative position with respect to the illumination device. In this case, the target areas can also have the same form. The difference therefore relates in particular to the size and/or orientation and/or relative position to the light source and/or to the deflection unit and/or form of the area.

According to a preferred embodiment of the invention, however, the deflection unit is a reflection unit reflecting the first cone of light in a beam-shaping manner. In particular, the deflection unit is a specifically formd or deformable mirror or one of which the deflection characteristics can be varied. The light to be deflected and to be shaped is therefore reflected at the beam-shaping element.

In a preferred variant of this embodiment, a reflection area which reflects the first cone of light in a beam-shaping manner is provided in the deflection unit. The reflection area is designed to be variable in terms of its reflection behaviour. In particular, the reflection area is designed such that the form can be varied. In particular, the reflection area is designed such that it can be adjusted mechanically.

In a preferred embodiment, the deflection unit contains at least two deflection elements, in particular multiple deflection elements. Each of the deflection elements is designed to deflect a true part of the first cone of light, that is to say not the whole of the first cone of light. The whole of the first cone of light is therefore deflected in its entirety by at least two different deflection elements, each of the deflection elements deflecting only a true part of the first cone of light in each case. By means of separately influencing the individual deflection elements, individual deflection of the individual part of the cone of light and, as a result, a particularly flexible possible way of deflecting the whole of the first cone of light is provided.

In a preferred variant of this embodiment, at least one, in particular all of the deflection elements, is/are designed to be movable. The mobility is defined either with respect to the first cone of light and/or with respect to individual deflection elements relative to one another. The result is thus a deflection element assembled from at least two, in particular multiple, individual movable elements. Depending on the number of deflection elements, a particularly wide range of variants or details in the deflection of the first cone of light is possible. Mobility is to be understood to mean either that the individual deflection element is intrinsically movable as an overall unit and/or in addition the deflection element is intrinsically itself of variable form. In particular if the individual deflection element is a lens or a reflector, its variability of form once more effects individual deflection of the respective part of the first cone of light.

In a further variant of this embodiment, at least one, in particular all of the deflection elements is/are designed to be intrinsically immovable. "Intrinsic immovability" is to be understood to the effect that the respective deflection element, although it can be moved in its entirety, is intrinsically rigid, firm or not deformable. In the case of a reflection area, the result is then the variability of form of the entire reflection area as a result of the movement of the intrinsically rigid deflection elements. For example, this involves multiple rigid individual mirrors which, placed together, form an overall mirror area, the overall mirror area being variable with respect to its overall deflection characteristics or beam-shaping characteristics.

In a preferred embodiment of the invention, the light source is a point light source. In particular, the light source is an individual LED or an LED arrangement or an LED array. In particular, point light sources are intrinsically unsuitable to illuminate any desired areas homogenously, so that it is precisely these which are made suitable by the invention for the use for the homogenous illumination of different areas.

This embodiment is based on the following findings: in order to illuminate or floodlight target areas, linear luminaires are often used in practice. These demand a relatively high amount of space. By means of the invention, the demand for space can be reduced to a minimum in that point light sources can replace the linear luminaires. In addition to the installation space, this also reduces any material costs and, depending on the design, increases the functionality of a corresponding illumination device. The visual appearance on the illuminated area is maintained or improved as compared with the linear luminaire, although the installation space can be reduced to a minimum. Since linear luminaires are often usual as so-called standard lighting in practice, according to the invention replacement of the standard lighting by the illumination device according to the invention can take place. Linear luminaires are, for example, standard lighting in large-capacity aircraft.

The illumination system of the present invention comprises an illumination device according to the invention, as has been described above. In addition, the illumination system further contains the cited target area to be illuminated in connection with the illumination device. Since the target area is always known or given as a constituent part of the illumination system, the illumination system can be adapted optimally to the target area. In particular if a plurality of target areas are known, for which respective illumination systems are to be used, the variability of the deflection unit can accordingly be adapted jointly for all illumination systems. Thus, structurally identical illumination systems are produced which can be used for all areas in order to produce the desired illumination conditions there.

In a preferred embodiment of the invention, the target area is a surface to be illuminated of an interior of a vehicle. The interior is in particular a cabin, in particular a passenger cabin. The vehicle is in particular an aircraft. The illuminated target area is in turn used for the (indirect) illumination of the interior.

According to the invention, it is therefore possible to achieve illumination and floodlighting of aircraft cabin surfaces which ensures adequate brightness in the cabin. In particular, according to the invention, the result is a point light source for illumination purposes in aircraft cabins which has the aforementioned characteristics. For the homogenous illumination of cabin surfaces, it is therefore possible, for example, for a point light source with a beam-shaping optical element in the form of the deflection unit to be used. Known linear luminaires in the aircraft can in this case be replaced by point light sources without changing the illumination result. The light reflected from the cabin elements, that is to say the target areas, then ensures the necessary brightness in the cabin.

The present invention is further directed to a method for illuminating a target area. In the method, a light source in operation emits a first cone of light towards a deflection unit, the deflection unit converting the first cone of light in a beam-shaping manner into a second cone of light and emitting the second cone of light towards the target area. The deflection unit is varied to the effect that the form of the second cone of light and/or the intensity distribution in the second cone of light is varied with respect to a cross section of the second cone of light. The method has already been explained above in a corresponding way in conjunction with the illumination device and the illumination system according to the invention—also with regard to the advantages and embodiments thereof. Repetition will be omitted here.

In a preferred embodiment of the invention, a desired brightness distribution on the target area to be illuminated is predefined. Then, if the desired brightness distribution has not yet resulted, the deflection unit is varied in such a way that that intensity distribution in the second cone of light according to which the target area is illuminated with the desired brightness distribution is achieved. In this case, care merely has to be taken that the desired brightness distribution lies within the scope of the possibilities of the ability of the deflection unit to be varied.

According to a preferred embodiment, the method is implemented with the aid of the illumination device according to the invention or with the aid of the illumination system according to the invention.

According to the invention, a use of the aforementioned illumination device or of the aforementioned illumination system for illuminating the target area also takes place. The target area is a surface to be illuminated of an interior of a vehicle. The interior is in particular a cabin, in particular a passenger cabin. The vehicle is in particular an aircraft.

BRIEF DESCRIPTION OF THE DRAWINGS

Further features, effects and advantages of the invention emerge from the following description of a preferred exemplary embodiment of the invention and the appended figures. Here, in a schematic basic sketch.

DETAILED DESCRIPTION OF THE INVENTION

Figure 1:
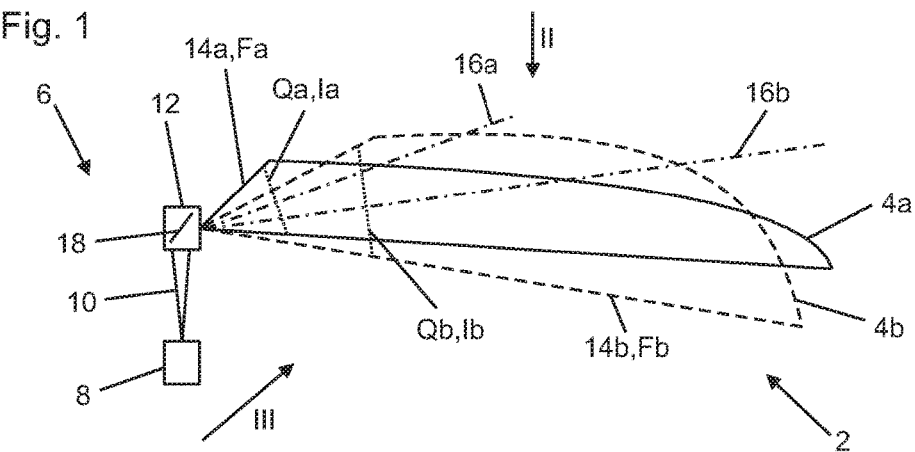
FIG. 1 shows an illumination system for illuminating a target area in side view.
Figure 2:
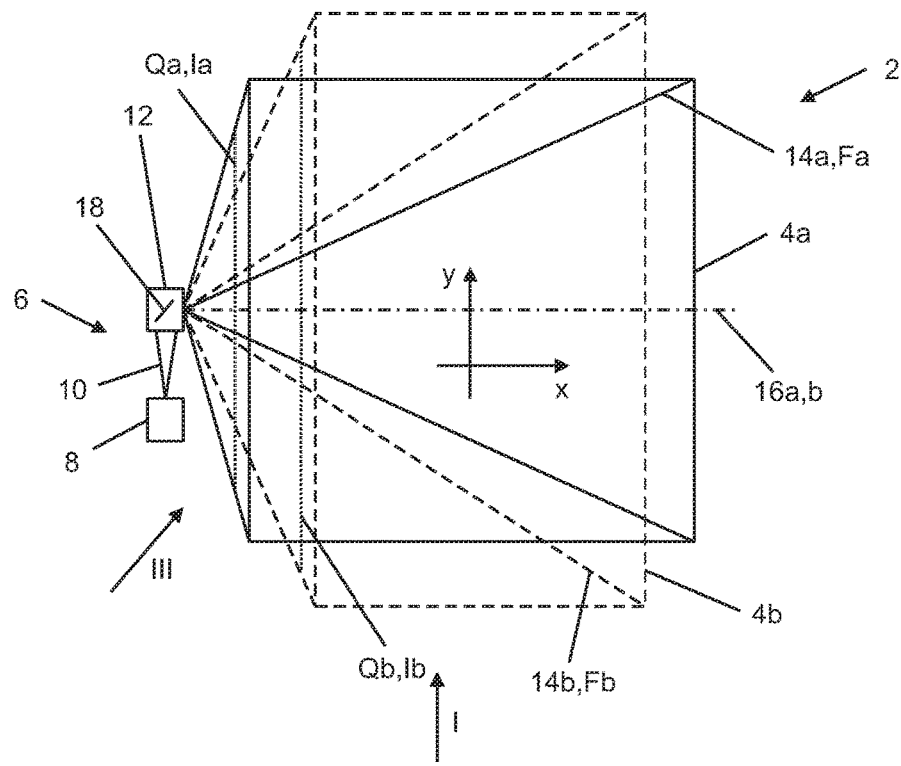
FIG. 2 shows the illumination system from FIG. 1 in plan view.
Figure 3:
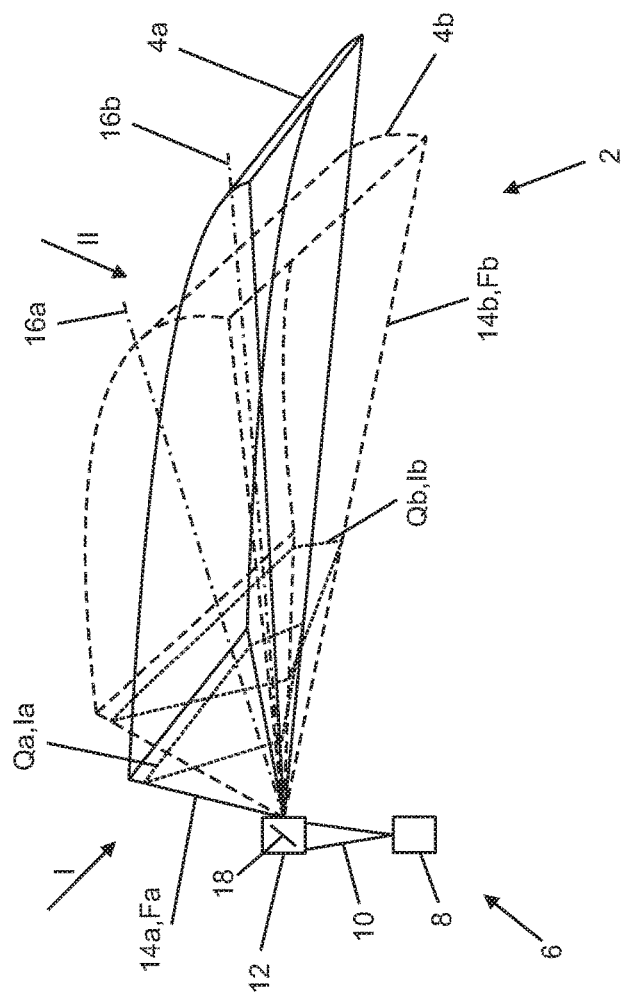
FIG. 3 shows the illumination system from FIG. 1 in a perspective view.

FIGS. 1 to 3 show an illumination system 2. FIG. 1 is a side view in the direction of the arrows I in FIGS. 2 and 3, FIG. 2 is a plan view in the direction of the arrows II in FIGS. 1 and 3, and FIG. 3 is a perspective view in the direction of the arrows III in FIGS. 1 and 2.

The geometric arrangement of all the components and all the beam paths of light are merely indicated symbolically in FIGS. 1-5.

FIG. 1 shows an illumination system 2 which includes a target area 4a and an illumination device 6. The illumination device 6 is used to illuminate the target area 4a. The illumination device 6 contains a light source 8. In operation, the light source 8 emits a first cone of light 10. The illumination device 6 additionally contains a deflection unit 12. The light source 8 is designed to emit the first cone of light 10 towards the deflection unit 12 in operation. The deflection unit 12 is designed to convert the first cone of light 10 in a beam-shaping manner into a second cone of light 14a. In addition, the deflection unit 12 is designed to emit the second cone of light 14a towards the target area 4a. The second cone of light 14a here has a form Fa. With regard to a cross section Qa viewed in the beam direction of the second cone of light 14a, the intensity distribution of the light in the second cone of light 14a has the intensity distribution Ia. The cross section Qa in the example extends in the form of a plane transversely with respect to a central beam 16a of the second cone of light 14a. The central beam 16a extends along the optical axis of the illumination device 6.

The deflection unit 12 is additionally designed to be variable to the effect that both the form F (position in the space and relative to the deflection unit 12 and to the light source 8, and also form) and also the intensity distribution I with respect to the cross section Q in the second cone of light 14a can be varied. Therefore, by way of example, FIG. 1 shows an alternative second target area 4b, which replaces the target area 4a in an alternative illumination scenario. The illumination device 6 is then used to illuminate the target area 4b. The deflection unit 12 then converts the first cone of light 10 into a second cone of light 14b which has a different form Fb and, with respect to its (in any case changed) cross-sectional area Qb, has a changed intensity distribution Ib. The second cross-sectional area Qb of the second cone of light 14b also extends transversely with respect to its central beam 16b.

In the example, the deflection unit 12 is a reflective deflection unit, that is to say a reflection unit which includes a reflection area 18. With the aid of the deflection unit 12, the first cone of light 10 is therefore deflected onto the reflection area 18 by reflection. Within the context of the reflection, the beam shaping to the form Fa,b and intensity distribution Ia,b of the second cone of light 14a,b also takes place.

In order to achieve the various forms Fa,b and intensity distributions Ia,b in the second cones of light 14a,b, the reflection area 18 in the deflection unit 12, which reflects the first cone of light 10 in a beam-shaping manner, is designed to be variable in terms of its reflection behaviour. In the example, this is achieved in that the form of the reflection area 18 is designed to be variable. The deflection unit 12 or the reflection area 18 is designed in such a way that, for the two target areas 4a,b in each case such intensity distributions Ia,b and forms Fa,b of the second cone of light 14a,b can be displayed that the respective target area 4a,b is floodlit by the respective second cone of light 14a,b with a respective homogenous brightness distribution.

The brightness distribution here extends homogenously either in one dimension, for example the x or y direction indicated in FIG. 2, or else in both dimensions x and y of the respective area 4a,b. This applies to both different target areas 4a,b.

The form Fa,b of the second cone of light 14a,b here is configured in such a way that the entire target area 4a or 4b is respectively floodlit. The target areas 4a,b are therefore floodlit completely in a pinpoint manner without being floodlit beyond the edge thereof. Alternatively, the illumination can also reach over the edges of the respective target area 4a,b.

In the example, the light source 8 is a point light source, here an individual LED, alternatively an LED arrangement or an LED array but which likewise represents a point light source in the sense of the invention.

The target area 4a,b is respectively a surface to be illuminated of an interior of a vehicle, here a cabin, more precisely a passenger cabin of an aircraft. The illuminated target area 4a,b for its part in turn ensures illumination of the interior in the vehicle by reflection of the light striking the said area.

FIG. 1 illustrates how identical illumination devices 6 are used to illuminate the two different target areas 4a,b. In practice, both target areas 4a,b exist simultaneously, for example within the same aircraft. Each of the target areas 4a,b is assigned a respective illumination device 6 which, with respect to its deflection unit 12, is set as described above, such that each of the target areas 4a,b is respectively illuminated with light with a homogenous brightness distribution. During the mounting or commissioning of the illumination devices 6, within each illumination device 6 the respective deflection unit 12 is varied or set in such a way that the desired form F and intensity distribution I is produced, in order to illuminate the respective target areas 4a,b respectively homogenously. Here, the respective desired brightness distribution, the homogenous brightness distribution in the example, on the target area 4a,b to be illuminated is predefined, and the deflection unit 12—if this does not yet achieve the desired result—is varied in such a way that the form F and intensity distribution I in the second cone of light 14a,b is achieved, in order to illuminate the target area 4a,b with the desired brightness distribution. The illumination devices 6 are therefore used to illuminate the respective target area 4a,b as part of the interior of the aircraft.

Figure 4:
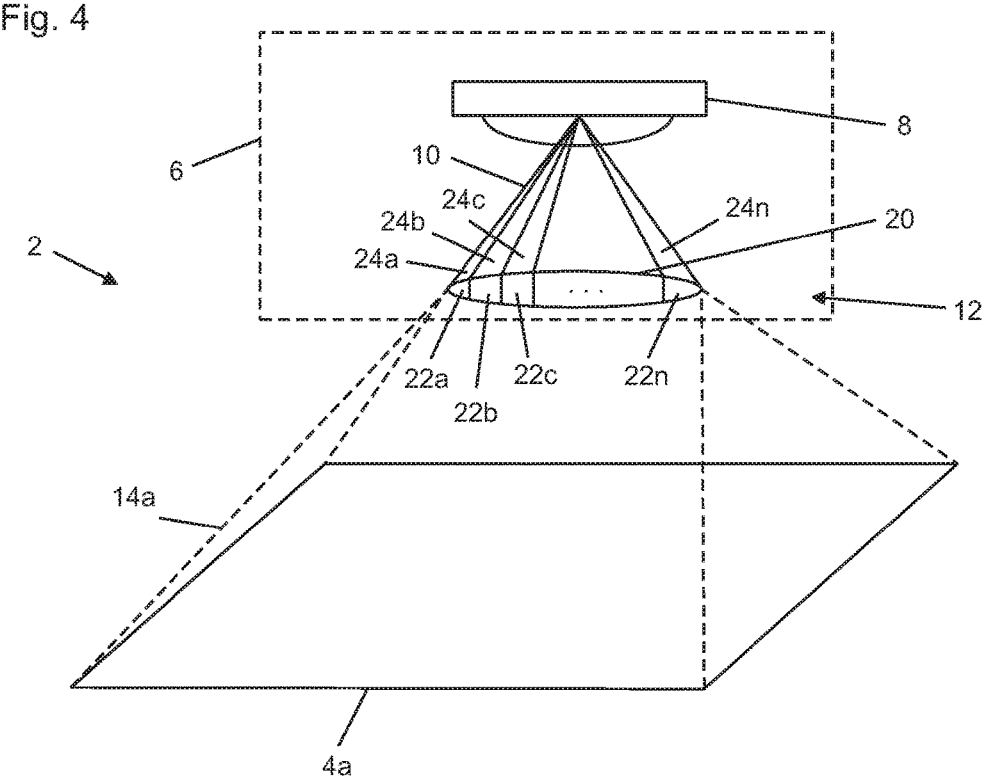
FIG. 4 shows an alternative illumination system with transmissive deflection unit with multiple deflection elements.

FIG. 4 shows an alternative illumination system 2, in particular comprising an alternative deflection unit 12 which, as opposed to FIGS. 1-3, is not a reflection unit but a transmission unit. This contains a lens 20 which, alternatively, can be a filter element, as beam-shaping element. Starting from the light source 8, the first cone of light 10 therefore passes through the deflection unit 12 or the lens 20 in order to be converted to the second cone of light 14a. The deflection unit 12 or the lens 20 has a multiplicity or number n of deflection elements 22a,b, . . . . Each of the n deflection elements 22 is designed to deflect a true part 24a,b, . . . (a total of n parts 24) of the first cone of light 10. All the deflection elements 22 taken together, which form the lens 20, then deflect all the parts 24 of the first cone of light 10 and therefore all of the first cone of light 10 in order to form the second cone of light 14a.

In order to form a deflection unit 12 which can be varied overall, the individual deflection elements 22 are designed to be movable with respect to the first cone of light 10. Alternatively or additionally, the individual deflection elements 22 are also designed to be movable individually in relation to one another. In a first embodiment, the deflection elements 22 are themselves variable in form, which means flexible. In an alternative embodiment, the deflection elements 22 are designed to be intrinsically immovable, which means rigid. In the first case, the individual deflection elements 22 can also alternatively be designed to be fixed in position or non-variable in their relative position with respect to the first cone of light 10.

Figure 5:
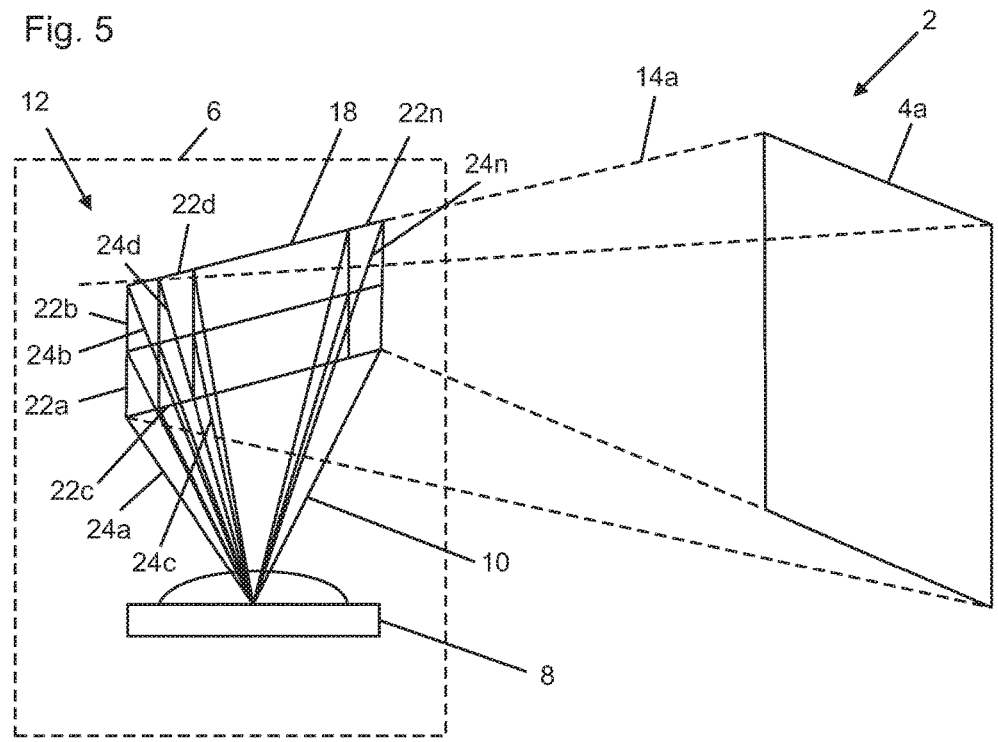
FIG. 5 shows an alternative illumination system with reflective deflection unit with multiple deflection elements.

FIG. 5 shows a further alternative illumination system 2 comprising an alternative illumination device 6. In this case, the deflection unit 12 is once more formed with a reflection area 18. In a similar way corresponding to FIG. 4, the reflection area 18 is also subdivided into a multiplicity of n deflection elements 22a, b, . . . which, in a way corresponding to FIG. 4, are designed to be movable or immovable with respect to the first cone of light 10 and here are themselves designed to be of variable form or not of variable form and, if appropriate, movable relative to one another. Each of the deflection elements 22 is a reflection element. All n deflection elements 22a,b, . . . together form the reflection area 18.

LIST OF DESIGNATIONS

2 Illumination system
4a,b Target area
6 Illumination device
8 Light source
10 First cone of light
2 Deflection unit
14a,b Second cone of light
16a,b Central beam
18 Reflection area
20 Lens
22a,b, . . . , n Deflection element
24a,b, . . . , n Part
Fa,b Form
Ia,b Intensity distribution
Qa,b Cross section
x,y Direction

What is claimed is:

1. An illumination device for illuminating at least one target area, comprising:
a light source for emitting a first cone of light, and
a deflection unit to which the first cone of light is emitted, wherein the deflection unit converts the first cone of light in a beam-shaping manner into a second cone of light and emits the second cone of light towards the at least one target area,
wherein the deflection unit is variable, such that a form of the second cone of light or an intensity distribution in the second cone of light is variable with respect to a cross section of the second cone of light,
wherein the deflection unit is variable, such that: a form of the second cone of light for completely floodlighting the at least one target area is achievable, and an intensity distribution in the second cone of light for floodlighting the at least one target area with a homogenous brightness distribution in at least one dimension is achievable,
wherein the deflection unit is variable, such that: when the at least one target area comprises two target areas, a form of the second cone of light for completely floodlighting one of the two target areas and a form of the second cone of light for completely floodlighting the other of the two target areas are achievable, and an intensity distribution in the second cone of light for floodlighting one of the two target areas with a homogenous brightness distribution in at least one dimension and an intensity distribution in the second cone of light for floodlighting the other of the two target areas with a homogenous brightness distribution in at least one dimension are achievable,
wherein the deflection unit comprises at least two deflection elements and each deflection element deflects a true part of the first cone of light, such that the entirety of the first cone of light is deflected by the at least two deflection elements to convert the first cone of light into the second cone of light, and
wherein all of the deflection elements are movable with respect to the first cone of light or with respect to one another.

2. The illumination device according to claim 1, wherein the deflection unit comprises a reflection unit reflecting the first cone of light in a beam-shaping manner.

3. The illumination device according to claim 2, wherein the deflection unit comprises a reflection area which reflects the first cone of light in a beam-shaping manner and which is variable in form.

4. The illumination device according to claim 1, wherein the light source comprises a point light source.

5. The illumination device according to claim 4, wherein said point light source comprises an individual LED or an LED arrangement.

6. An illumination system comprising an illumination device according to claim 1 and the at least one target area to be illuminated.

7. The illumination system according to claim 6, wherein the at least one target area is a surface to be illuminated of an interior.

8. The illumination system according to claim 7, wherein said interior is of a cabin of a vehicle.

9. The illumination system according to claim 8, wherein said vehicle is an aircraft.

10. A method for illuminating a target area, in which a light source in operation emits a first cone of light towards a deflection unit, the deflection unit converting the first cone of light in a beam-shaping manner into a second cone of light and emitting the second cone of light towards the target area, wherein the deflection unit is varied to the effect that a form of the second cone of light or an intensity distribution in the second cone of light is varied with respect to a cross section of the second cone of light, wherein the deflection unit comprises at least two deflection elements and each deflection element deflects a true part of the first cone of light, such that the entirety of the first cone of light is deflected by the at least two deflection elements to convert the first cone of light into the second cone of light, and wherein all of the deflection elements are movable with respect to the first cone of light or with respect to one another.

11. The method according to claim 10, wherein a desired brightness distribution on the target area to be illuminated is predefined, and the deflection unit is varied in such a way that the intensity distribution in the second cone of light according to which the target area is illuminated with the desired brightness distribution is achieved.

12. A method for illuminating a target area comprising illuminating a surface of said target area with the illumination device according to claim 1.

13. A method for illuminating a target area comprising illuminating a surface of said target area found in the illumination system according to claim 6.

* * * * *